(12) United States Patent
Andrewartha et al.

(10) Patent No.: US 7,694,091 B2
(45) Date of Patent: Apr. 6, 2010

(54) NON-VOLATILE STORAGE FOR BACKING UP VOLATILE STORAGE

(75) Inventors: J. Michael Andrewartha, Plano, TX (US); James Hess, McKinney, TX (US); David Maciorowski, Longmont, CO (US); Edward A. Cross, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 353 days.

(21) Appl. No.: 11/585,007

(22) Filed: Oct. 23, 2006

(65) Prior Publication Data

US 2008/0098157 A1     Apr. 24, 2008

(51) Int. Cl.
*G06F 11/08* (2006.01)
*G06F 12/16* (2006.01)

(52) U.S. Cl. .................................. 711/162; 711/103
(58) Field of Classification Search .............. 711/103, 711/162, 209
See application file for complete search history.

(56) References Cited

U.S. PATENT DOCUMENTS

| | | | | |
|---|---|---|---|---|
| 5,608,684 | A * | 3/1997 | Reasoner et al. | 365/228 |
| 5,644,701 | A * | 7/1997 | Takewaki | 714/20 |
| 6,581,132 | B1 * | 6/2003 | Kakinuma et al. | 711/103 |
| 6,587,915 | B1 * | 7/2003 | Kim | 711/103 |
| 6,854,046 | B1 * | 2/2005 | Evans et al. | 711/203 |
| 7,053,903 | B1 * | 5/2006 | Junklewitz | 345/531 |
| 7,062,675 | B1 * | 6/2006 | Kemeny et al. | 714/15 |
| 7,234,036 | B1 * | 6/2007 | Chang et al. | 711/202 |
| 7,360,039 | B2 * | 4/2008 | De Jong et al. | 711/156 |
| 2003/0131206 | A1 * | 7/2003 | Atkinson et al. | 711/156 |
| 2005/0055481 | A1 * | 3/2005 | Chou et al. | 710/52 |
| 2005/0138311 | A1 * | 6/2005 | Ko | 711/162 |
| 2006/0294295 | A1 * | 12/2006 | Fukuzo | 711/105 |
| 2006/0294330 | A1 * | 12/2006 | Stanfill | 711/159 |
| 2007/0101077 | A1 * | 5/2007 | Evanchik et al. | 711/162 |
| 2008/0016289 | A1 * | 1/2008 | Pennock et al. | 711/148 |
| 2008/0072070 | A1 * | 3/2008 | LaMacchia et al. | 713/193 |

OTHER PUBLICATIONS

The Open Group, Single UNIX Specification v. 2, Jan. 1, 1997.*
Kath, Managing Memory-Mapped Files in Win32, Microsoft, Feb. 9, 1993.*

* cited by examiner

*Primary Examiner*—Matt Kim
*Assistant Examiner*—Hal Schnee

(57) ABSTRACT

One embodiment of a non-volatile memory system comprises block-accessible non-volatile memory, random access memory arranged to be linearly addressable by a processor as part of the processor's memory address space, to be read from and written to by the processor, and logic interposed between the block-accessible non-volatile memory and the random access memory and arranged to write parts of the content of the random access memory in blocks to blocks of the non-volatile, block-accessible memory. The logic is arranged to monitor processor writes to the random access memory, and to write blocks of the random access memory that differ from a most recent copy in the non-volatile, block-accessible memory to the non-volatile, block-accessible memory.

19 Claims, 3 Drawing Sheets

NON-VOLATILE STORAGE FOR BACKING UP VOLATILE STORAGE

BACKGROUND

Computers have various forms of memory and storage. Information that is in active use by a processor is commonly held in random-access memory (RAM). In general, the term "random-access memory" (RAM) indicates memory that is comparatively fast, and can be accessed, both for reading and for writing, in the smallest amount that can be addressed by the computer system, commonly individual words or bytes, but that is "volatile," which is to say that information is retained in the memory only as long as power is supplied to the memory.

Information that is intended to survive an interruption in the power supply, either deliberate, as when a computer is shut down, or undesired, is commonly held in non-volatile storage (NVS). In general, the term "non-volatile storage" indicates storage that retains its contents without requiring a power supply. Non-volatile storage is commonly slower than RAM, and many forms of non-volatile storage are block-accessible. In general, the term "block-accessible" indicates memory or other storage that can be read from and/or written to only in blocks that are large compared with the smallest amount of memory that can be addressed by the computer system.

An example of non-volatile, block-accessible memory is the memory commonly known as "NAND flash memory." Flash memory comprises devices connected so that they can be set individually, will then retain the set state, and thus the data represented by a pattern of set and unset devices, but can be reset by only in blocks. One common form of flash memory comprises floating gate transistors connected so that they can be set individually by charging the floating gate, will then retain the charge, and thus the data represented by a pattern of set and unset transistors, but can be reset by discharging the floating gate only in blocks. It is physically possible to address NAND flash memory at a byte or word level. However, because of the need for error checking, NAND flash memory is usually configured so that it is written to and read only in pages over which the error correction operates, which may be the same size as, or smaller than, the reset blocks.

In order to reduce the inconvenience of the slow response time of non-volatile storage, it has been proposed to provide non-volatile storage devices, including flash memory, with a RAM cache. However, such storage devices are conventionally configured to be addressed by a processor as if the processor were addressing the non-volatile storage directly. If the non-volatile storage is block-addressable, the entire storage device, including the cache, is addressed in blocks.

In ordinary use of a computer, information that is not being used is commonly kept in files in block-addressable non-volatile storage (BANVS). When a program, or a person operating a program, wishes to use such information, copies of the files are read from the non-volatile storage into RAM. The program directly operating on the information may access the RAM containing the copy files as RAM, byte by byte or word by word, but recognizes that the files are files, and conducts all disk accesses in files or storage blocks. Even where the NVS has a cache consisting physically of RAM, the cache is not accessed by user programs as if it was RAM. The file system managing the NVS manages transfers of files between the user programs and the cache as if the cache is part of the block-addressable NVS.

It has been proposed for system firmware to keep small amounts of important information such as configuration data in non-volatile RAM (NVRAM), for example, battery-backed static RAM. NVRAM can be addressed in small increments like ordinary RAM, retains its contents when the power supply to the computer fails, and is faster than ordinary NVS such as disk drives. Because the NVRAM itself is non-volatile, the data are not copied to block-addressable NVS, and thus are not treated as files or blocks. However, available NVRAM devices are expensive, and the batteries that they require are bulky, in electronic terms. In addition, batteries are considered undesirable in certain applications. Common usage of NVRAM is to store data that is accessed often but does not change frequently.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, examples of which are illustrated in the accompanying drawings.

Figure 1:
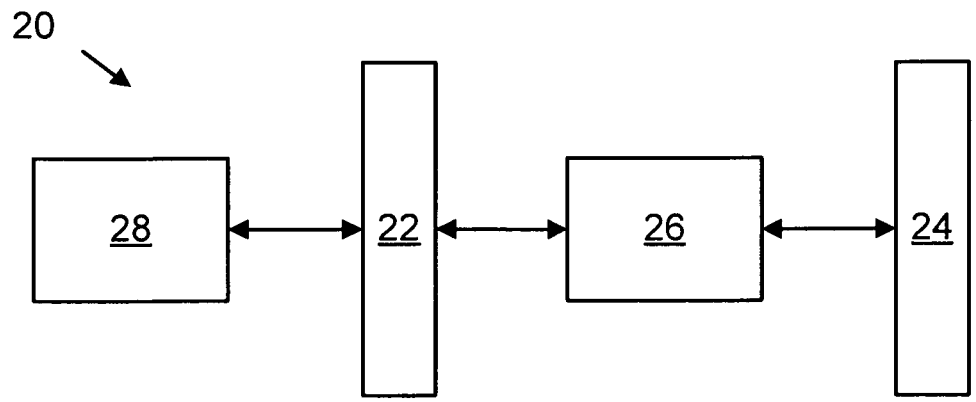
FIG. 1 is a block diagram of an embodiment of a memory system.

Referring to the drawings, and initially to FIG. 1, one form of memory system, indicated generally by the reference numeral 20, comprises a random access memory (RAM) 22, a block-addressable non-volatile storage device (NVS) 24, and logic 26 arranged to copy blocks of data between the RAM 22 and the NVS 24.

In operation, the RAM 22 is in the RAM address space of a processor 28, which is programmed to treat the RAM 22 as non-volatile RAM.

Figure 2:
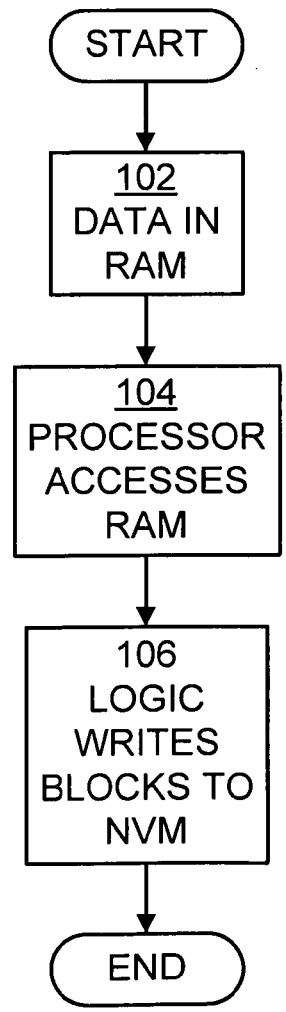
FIG. 2 is a flowchart.

Referring to FIG. 2, in one form of method of maintaining a set of data, in step 102 the data are provided in RAM 22. In step 104, the processor 28 is permitted to access RAM 22 to read and write the data. The processor 28 addresses the RAM 22 as non-volatile RAM, with a range of addresses in the address space of the processor.

In step 106, the logic 26 monitors the RAM 22, and at appropriate times copies the contents of blocks of the RAM 22 containing data that have been written by the processor 28 to the block-addressable NVM 24.

Figure 3:
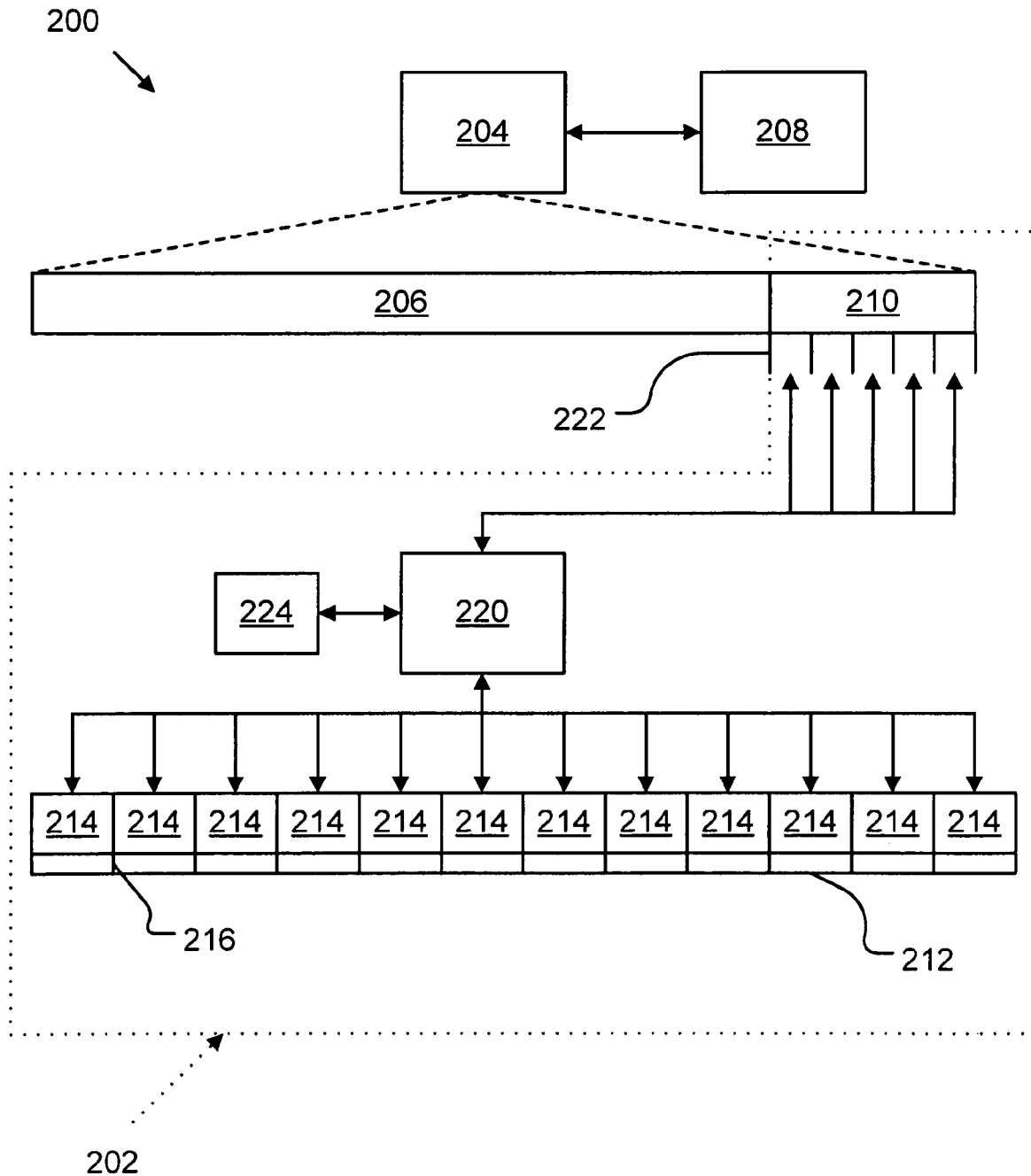
FIG. 3 is a block diagram of a second embodiment of a memory system.

Referring now to FIG. 3, an embodiment of a computer system indicated generally by the reference numeral 200 includes a second embodiment of a memory system, indicated generally by the reference numeral 202.

The computer system 200 includes a processor 204 having an address space and RAM 206 that is addressable within the address space. The computer system 200 may also include other devices and resources 208 that may be conventional and, in the interests of conciseness, are not further described here.

The computer system 200 includes RAM 210 that the processor 204 is programmed to treat as non-volatile RAM (NVRAM), and to use for storing configuration data. The RAM 210 forms part of the memory system 202. The RAM 210 may physically be part of, or identical to, the RAM 206, or may be a distinct physical RAM device. In the interests of clarity, the RAM 206, 210 is shown as being addressed directly by the processor 204. Alternatively, however, the processor 204 may address logical addresses in its own address space that are then decoded to the physical addresses of the RAM 206, 210.

The memory system 202 further comprises block-addressable non-volatile memory in the form of a NAND flash device 212. The NAND flash device 212 comprises memory that is organized in pages 214 containing, for example, 512 bytes or 2048 bytes of data. In addition, each page 214 contains space for error correction data and for metadata 216. The metadata may include, for example, a logical page number and a timestamp or sequence number from which the order in which pages 214 that are successive copies of a single logical page were written can be determined.

The NAND flash memory 212 will retain that data without requiring a power supply. The flash memory 212 is written to and read from by a logic device 220 in complete pages 214 to make use of the error correction data 216. The flash memory 212 can be erased only in blocks of one or more pages. The flash memory 212 has a lifetime of a large but not infinite number of write and erase cycles, and the logic device 220 is therefore arranged to write to each page 214 in turn, and to erase and reuse pages only when necessary. To increase the speed of writes, a pool of unused or erased pages is maintained in normal operation. Because of the finite life of the flash memory 212, the flash memory is suited to uses where updates are infrequent.

The logic device 220 copies pages of data between the pages 214 of the flash memory 212 and the RAM 210. For the use of the logic device 220, the RAM 210 is divided into pages 222 corresponding in size to the pages 214 of the flash memory 212. The RAM pages 222 may be transparent to the processor 204. Because of the finite life of the flash memory 212, and because NAND flash memory is comparatively inexpensive, the flash memory 212 is several times the size of the RAM 210.

The logic device 220 may be, for example, a field programmable gate array, or an auxiliary or control processor programmed in firmware. The logic device 220 could be embedded with the RAM 210 or the flash memory 212, or both, in a single IC package, or integrated onto a single die.

Figure 4:
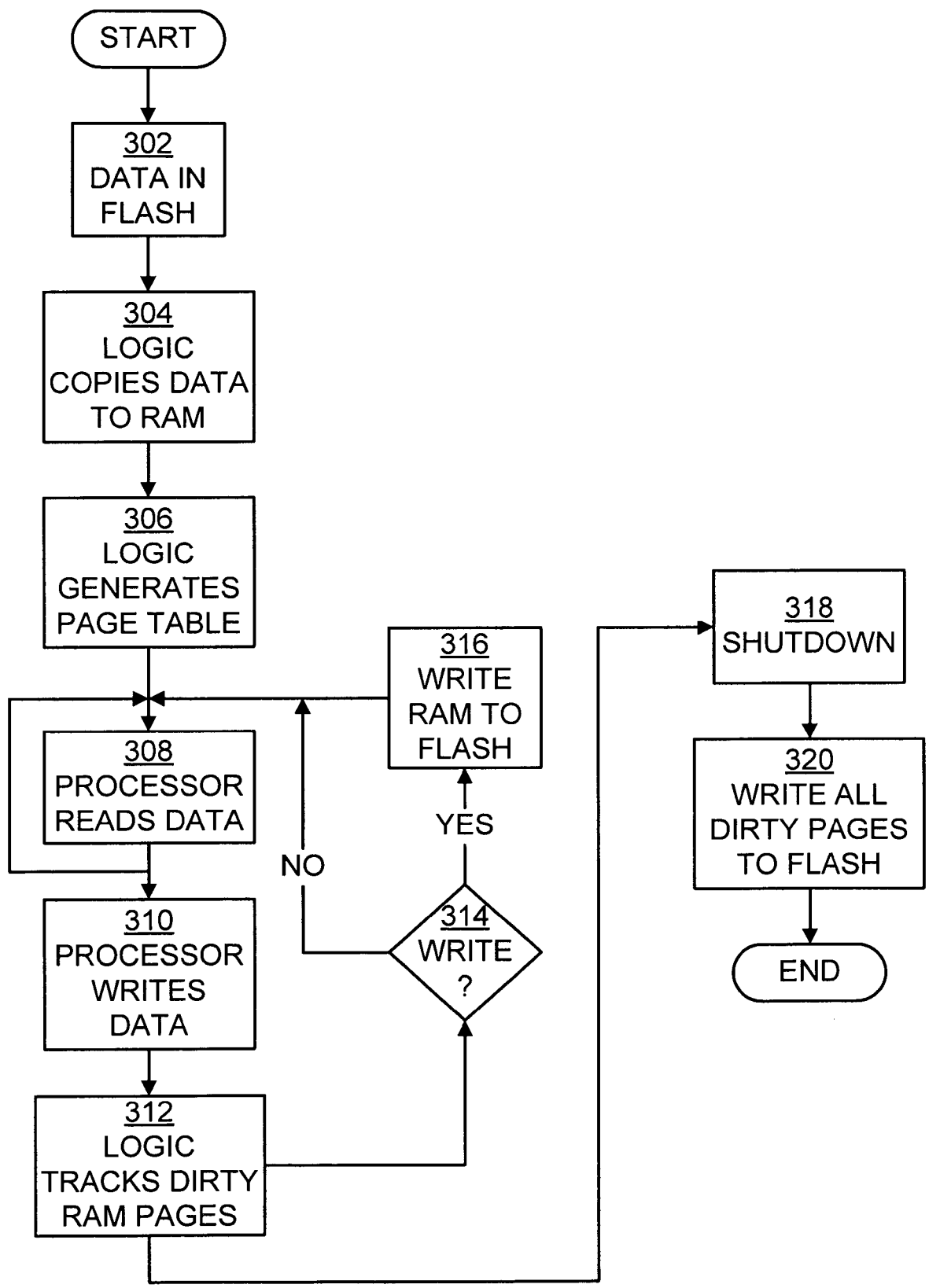
FIG. 4 is a flowchart.

Referring now to FIG. 4, in one embodiment of a method of operation, in step 302 the configuration data are stored in certain pages 214 of the flash memory 212. At startup of the computer system 200, in step 304 the logic device 220 copies the configuration data to the pages 222 of the RAM 210. In order to create the correct pages 222, the logic device 220 inspects the metadata 216 of the flash memory pages 214, and identifies the most recent copy of each page 222. For this purpose, the metadata 216 may comprise a logical page number among the pages 222, and a timestamp or sequence number indicating the order in which pages 214 were written.

In step 306, the logic device 220 may also generate in its own volatile memory 224 a page table for the flash memory 212. As will become apparent, the page table may show at least which pages 214 contain current data, which pages contain old data, and may be erased and reused, and which pages are unused or erased and are ready for reuse. The logic device 220 may also store in the volatile memory 224 the last used or next value of the sequence number. The page table may also store at least some history, for example, to assist in deciding which of the pages containing old data to erase first. In the process shown in FIG. 4 altered RAM pages 222 are not written back to the same pages of flash memory 212 from which they were read, so a full page table concordance between the flash pages 214 and the RAM pages 222 may be omitted.

In step 308, the processor 204 reads and uses the configuration data from the RAM 210, and in step 310 the processor writes amended configuration data to the RAM 210.

In step 312, the logic device 220 tracks the addresses in RAM 210 to which the processor 204 has written, and maintains a record of which RAM pages 222 are "dirty," that is to say, contain data different from the most recent data in the flash memory 212.

In step 314, the logic device 220 decides which dirty pages 222 to write to flash memory 212. For example, the logic device 220 may be set to keep the number of dirty pages 222 below a specified maximum, and may then write the least recently altered RAM page 222, or the RAM page with the oldest amendment, to a flash page 214. For example, where the processor 204 is writing predominantly to sequential addresses in the RAM 210, the logic device 220 may write a RAM page 222 to flash memory 212 when the point at which the processor 204 is writing moves off the RAM page in question.

In step 316, the logic device 220 writes the data from the selected RAM page 222 in question to the next available flash page 214, with the correct metadata 216 to show which RAM page 222 is being written and when it was written. The logic device 220 also updates the record of dirty RAM pages 222, and updates the page table to show that flash page 214 is no longer available. The logic device 220 may also update the page table to show that the flash page 214 containing the previous version of the same RAM page 222 is now obsolete, and may be erased. Alternatively, the logic device 220 may retain one or more of the most recent obsolete copies of each flash page 214 as backups in case of an unrecoverable failure in the current page. Alternatively, if the computer system 220 is frequently restarted, the list of obsolete pages may be updated only in step 306.

In step 318, the computer system 200 shuts down. If the shutdown is deliberate and orderly, in step 320 the logic device 220 writes all dirty RAM pages 222 to flash pages 214, with the correct metadata, but may omit updating the page table, if the page table will lose data in the shutdown. If the shutdown is unexpected, the logic device 220 may be alerted by a power fail interrupt from the processor 204 or from an auxiliary device (not shown). The logic device then carries out step 320 using power stored locally, for example, in capacitances associated with the devices 210, 212, 220. The maximum number of dirty RAM pages 222 mentioned in step 314 may be selected to ensure that the logic device 220 will be able to save all of them with the locally stored power.

Depending on the nature of the shutdown, the process then either terminates or returns to step 302 to restart the computer system 200.

Various modifications and variations can be made in the present invention without departing from the spirit or scope of the invention. For example, the computer system 200 has been shown with a single processor 204. The computer system 200 may be a multi-processor system, and the RAM 210 may then be accessed by two or more processors, either sharing the same data or using separate data in distinct parts of the RAM 210, which may be separate RAM pages 222. Other components that are shown and/or described singly in or with reference to FIG. 3 may also be multiplied, for increased capacity, flexibility, and/or redundancy.

The memory system 202 may be physically embodied in various forms. For example, the RAM 210 may be a separate RAM addressed through a separate physical path from the main RAM 206 of the processor 204. The RAM 210, flash memory 212, and logic device 220 may be distinct devices, which may be on a common circuit board. The common circuit board may be the circuit board carrying the processor 204, or the RAM 206, or both, or may be a separate board. Alternatively, the RAM 210, flash memory 212, and logic device 220, or any two of those devices, could be integrated into a single die, or into dies in a single integrated circuit package. Alternatively, part or all of the functionality of the memory system 202 could be incorporated into the processor chipset.

Thus, it is intended that the present invention cover the modifications and variations of this invention provided they come within the scope of the appended claims and their equivalents.

What is claimed is:

1. A non-volatile memory system comprising:
    flash memory configured as block-accessible non-volatile memory ("NVM"), where the NVM being randomly accessible;
    random access memory ("RAM"), arranged to be linearly addressable by a processor as part of the processor's memory address space, to be read from and written to by the processor;
    the RAM including a first RAM and a second RAM where the processor is configured to treat the first RAM as non-volatile memory;
    logic separate from the processor and interposed between the block-accessible non-volatile memory and the random access memory without being interposed between the processor and the random access memory and arranged to write parts of the content of the random access memory in blocks to blocks of the non-volatile, block-accessible memory; and
    wherein the logic is arranged to monitor processor writes to the random access memory, and maintain a list of sections of the RAM that have been written to by the processor and not yet written to the NVM, each section constituting a dirty block, and the logic arranged to write a dirty block to the NVM when the number of dirty blocks exceeds a predetermined limit, the predetermined limit being based on the number of sections of the RAM that may be written to the NVM when a power supply to the NVM is lost.

2. A non-volatile memory system according to claim 1, further comprising configuration data stored in the first RAM and where the logic is configured to copy the configuration data from the non-volatile, block-accessible memory to the random access memory upon startup of a computer system.

3. A non-volatile memory system according to claim 1, wherein the block-accessible memory is larger than the random access memory that is written to the block-accessible memory, and wherein the logic arranged to write is arranged to write from the random access memory to vacant blocks of the block-accessible memory and to write to the block-accessible memory metadata enabling the most recently written copy of a part of the random access memory to be identified.

4. A non-volatile memory system according to claim 1, further comprising at least one logic device independent of the processor comprising at least part of the logic arranged to write from the random access memory to the block-accessible memory.

5. A non-volatile memory system according to claim 1, further comprising an integrated circuit package containing at least two of the random access memory, the non-volatile memory, and the logic.

6. A non-volatile memory system according to claim 1, wherein in operation the random access memory contains a complete copy of current contents of the memory system, and wherein the block-accessible memory contains copies of all parts of the contents of the memory system other than parts that have been altered in the random access memory and await writing to the block-accessible memory.

7. A memory system according to claim 6, wherein:
    the block-accessible memory is larger than the random access memory;
    the logic is arranged to write blocks of the content of the random access memory to vacant blocks of the non-volatile, block-accessible memory; and
    the logic is arranged to write to the non-volatile memory metadata enabling a most recent copy of each block of the random access memory to be identified.

8. A memory system according to claim 7, further comprising logic arranged to read the most recent copy of each block from the non-volatile memory and write such content to the random access memory in order to initialize the random access memory.

9. A computer system comprising: a processor;
    random access memory ("RAM") comprising a first RAM and a second RAM, wherein the processor is arranged to address the random access memory and where the processor is configured to treat the first RAM as non-volatile memory;
    flash memory configured as non-volatile, block-accessible memory ("NVM"), the NVM being configured to store configuration data in blocks where each block includes error correction data, and the NVM being randomly accessible;
    logic separate from the processor and interposed between the block-accessible non-volatile memory and the random access memory without being interposed between the processor and the random access memory and arranged to monitor processor writes to the RAM and maintain a list of sections of RAM that have been written to by the processor and not yet written to the NVM, each section constituting a dirty block, and the logic arranged to write a dirty block to the NVM when the number of dirty blocks exceeds a predetermined limit, the predetermined limit being based on the number of sections of the RAM that may be written to the NVM when a power supply to the NVM is lost; and
    where the logic is configured to copy selected blocks of the configuration data to the RAM at a startup of the computer system and to correct errors using the error correction data associated with the selected blocks in the NVM.

10. A computer system according to claim 9, further comprising logic arranged to read contents of blocks of the non-volatile, block-accessible memory to the random access memory after an event that causes loss of the contents of the random access memory.

11. A computer system according to claim 10, wherein the logic comprises logic arranged to initialize the random access memory after the event that causes loss of the contents thereof by reading from the block-accessible memory and writing to the random access memory a most recent copy of each part of the random access memory.

12. A computer system according to claim 9, further comprising logic arranged to write to the block accessible memory any part of the random access memory that differs from a most recently written copy of that part in response to the beginning of an event that causes loss of the contents of the random access memory.

13. A method of maintaining a set of data, comprising:
providing random-access memory (RAM) containing the set of data;
permitting a processor to address the RAM linearly solely as part of the processor's random access memory address space and to read from and write to the RAM data forming parts of the set of data;
configuring the RAM into a first RAM and a second RAM where the processor treats the first RAM as non-volatile memory;
providing block-accessible non-volatile memory (NVM) that is randomly accessible at least as large as the RAM, the NVM being in comparison with the RAM limited in the number of times it may be written to before becoming unreliable;
monitoring processor writes to the RAM after the processor has written to the RAM and maintaining a list of sections of RAM that have been written to by the processor and not yet written to NVM, each section constituting a dirty block; and
writing from the RAM to the NVM a dirty block when the number of dirty blocks exceeds a predetermined limit, the predetermined limit being based on the number of sections of RAM that may be written to the NVM when a power supply to the NVM is lost.

14. A method according to claim 13, further comprising:
storing configuration data in blocks of the NVM where each block includes error correction data; and
initializing blocks of the RAM by copying selected blocks of the configuration data from the NVM to the RAM at a startup of a computer system and to correct errors using the error correction data associated with the selected blocks in the NVM.

15. A method according to claim 14, further comprising initializing the RAM by reading from the NVM blocks of data containing the whole set of data.

16. A method according to claim 13, wherein the NVM is larger than the RAM, further comprising dividing the RAM into pages corresponding in size to blocks of NVM, wherein writing to the NVM comprises writing pages from the RAM to vacant blocks in the NVM, and further comprising reading from the NVM to the RAM, wherein the reading includes identifying and reading a most recent copy in the NVM of a RAM page.

17. A computer system according to claim 9, wherein the logic is further arranged to keep a page table of the dirty blocks in a second random access memory.

18. A computer system according to claim 9, wherein the logic is further arranged to write a dirty block to NVM only after the processor writes to a block of the RAM different from the dirty block.

19. A computer system according to claim 9 where the RAM is organized into blocks for storing data and wherein the logic is further arranged to retain at least two copies of each block of the RAM, one copy being the most recently written copy and the second copy being the copy of RAM being written to the NVM most recently before the one copy.

* * * * *

UNITED STATES PATENT AND TRADEMARK OFFICE
CERTIFICATE OF CORRECTION

PATENT NO. : 7,694,091 B2
APPLICATION NO. : 11/585007
DATED : April 6, 2010
INVENTOR(S) : J. Michael Andrewartha et al.

It is certified that error appears in the above-identified patent and that said Letters Patent is hereby corrected as shown below:

In column 8, line 27, in Claim 19, delete "claim 9" and insert -- claim 9, --, therefor.

Signed and Sealed this

Twenty-ninth Day of June, 2010

David J. Kappos
*Director of the United States Patent and Trademark Office*